June 30, 1959    LA VERNE ERICKSON    2,892,279
FISHING APPARATUS
Filed Nov. 13, 1957

INVENTOR.
LAVERNE ERICKSON
BY
H. F. Woodward
atty.

United States Patent Office 2,892,279
Patented June 30, 1959

2,892,279

FISHING APPARATUS

La Verne Erickson, Hugo, Minn.

Application November 13, 1957, Serial No. 696,111

3 Claims. (Cl. 43—4)

This invention relates to fishing apparatus for use in fishing through the ice.

The principal objects of the invention are to provide a construction in which the reel for the fishing line and/or the bobber hang down below the surface of the water where they will not freeze easily, and to provide an apparatus that can be produced at reduced manufacturing costs.

The invention consists in the improvements which shall be described hereinafter.

Figure 1:
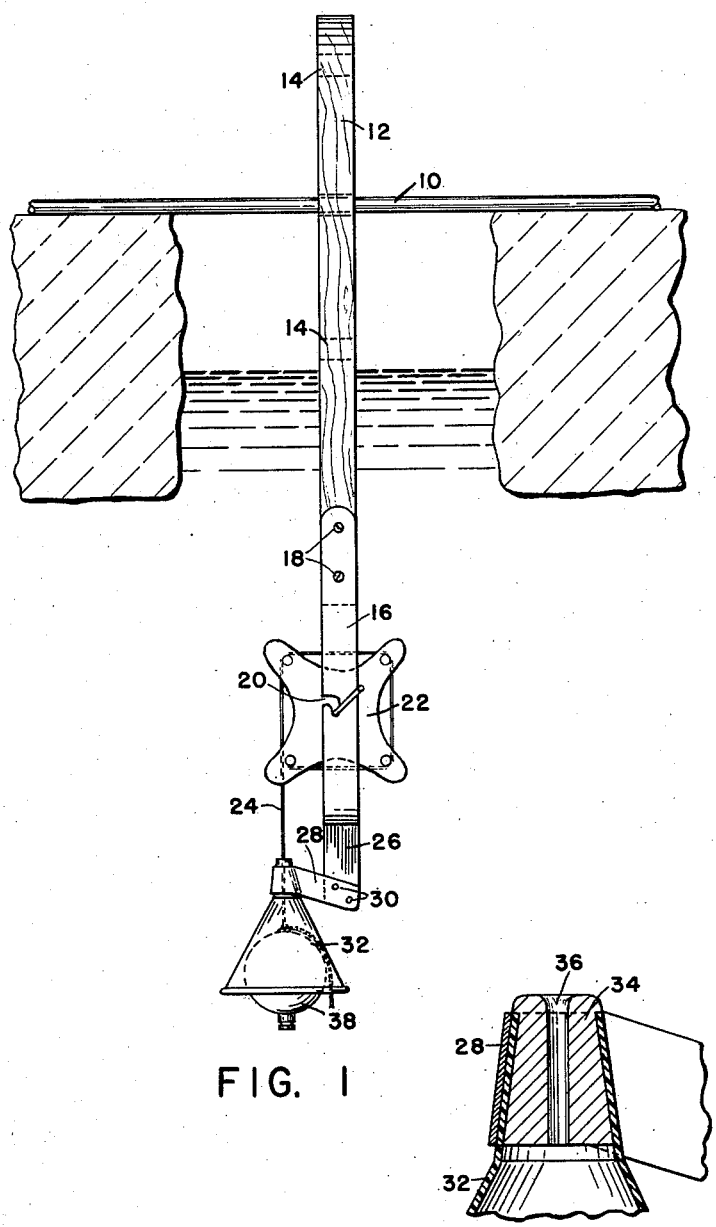
Figure 1 is a side view of the new fishing apparatus in its operating position.
Figure 2:
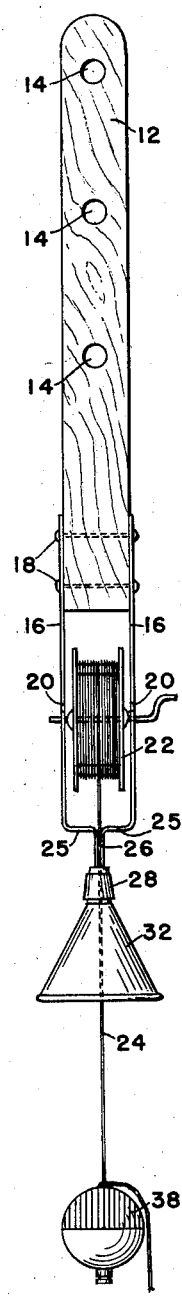
Figure 2 is a front view of the apparatus.
Figure 3:
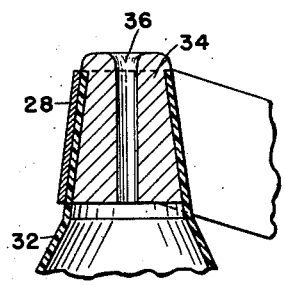
Figure 3 is a sectional view with parts broken away of the bobber retaining means.

An apparatus of this kind is used for fishing in the wintertime, the fisherman cutting a hole or holes in the ice for one or more of the apparatuses and when a fish is caught pulling it through the hole in the ice. It has been customary to use the so-called "Tip-Up" but in some states, such as Minnesota, such an apparatus cannot legally be used and under these conditions it is desirable to use a bobber.

The supporting bar or rod 10 rests upon the ice and this rod 10 supports upright bar 12. Bar 12 is provided with a plurality of openings 14 so that the reel and/or the bobber retaining means can be positioned under the surface of the water regardless of the thickness of the ice. For supporting a reel and a bobber retaining means there is secured to the side of the lower end of bar 12, members 16. The members 16 are secured to the bar 12 by suitable securing means 18. The members, after extending substantially parallel for a distance, are bent inwardly at 25 to form a substantially closed frame. Openings 20 are positioned in the members 16 for supporting reel 22. The reel is removably mounted in the openings 20 to turn freely. It is to be understood that any suitable type of reel may be used. The lower ends 26 of the metal members 16 have secured thereto at 30, arm 28. Arm 28 preferably consists of one piece of material folded to give two thicknesses with the free end formed to receive funnel-like member 32.

The member 32 should be of such material that is not easily damaged by freezing weather. The member 32 must be of such material that the fisherman can see the bobber 38 when held under water. The funnel-like member 32 may be made of "neoprene." A metal plug 34 is forced through the portion of the funnel surrounded by the arm 28 thereby securing the member 32 in place. The plug 34 is provided with opening 36 for free passage of line 24. The opening 36 should be in approximate alignment with the reel post which supports the line on the reel.

It is to be understood that the invention described is capable of modifications as to details of construction and arrangement within the scope of the invention herein disclosed and claimed.

What is claimed is:

1. An ice fishing device comprising, a bar having side edges adapted to extend generally vertically through a hole in the ice on a body of water, said bar having spaced apart rod receiving openings therein, a rod extending through one of the said openings and engageable with the upper surface of the ice for supporting the bar, metal arms having free ends secured to the side edges of said bar adjacent one end and extending downwardly in substantially parallel relationship to provide means for supporting a fish line reel, a fish line reel removable supported by the said parallel metal arms, the said parallel arms being bent inwardly and then downwardly at a point spaced from the free ends to form a closed frame with a downwardly extending leg, a folded metal member having its free ends secured to the downwardly extending leg, and a downwardly opening funnel-like receptacle having a throat opening for free passage of a fish line, said funnel being secured to the folded member adjacent its free end below the said reel, the said funnel member being of a size to freely receive through the open lower end a fishing bobber attached to a fish line.

2. A fishing device comprising, a bar adapted to extend generally vertically through a hole in the ice on a body of water, said bar having spaced openings therein, a rod extending through one of said openings and engageable with the upper surface of the ice for supporting the bar, metal arms attached to said bar at their free ends in such a manner as to extend downwardly in a substantially parallel relationship, each of said arms having a slot opening formed therein and extending to an edge thereof for removably supporting a fish line reel, a fish line reel, said metal arms being bent inwardly to form a closed frame and then downwardly to form a downwardly extending leg, an arm member having a free end extending outwardly at an angle to the leg, said arm member having a funnel-like member receiving opening adjacent the free end thereof, and a downward opening funnel-like member having a throat opening secured in the opening in the said arm member, said funnel-like member being of a size to freely receive through the open lower end a fishing bobber attached to a line passing through the said throat opening to the reel.

3. A device set forth in claim 2 in which the funnel-like member is secured in place by means of a plug extending into the throat opening of the funnel-like member, said plug having a fishing line opening extending therethrough.

References Cited in the file of this patent

UNITED STATES PATENTS

| | | |
|---|---|---|
| 952,812 | Jorgensen | Mar. 22, 1910 |
| 1,294,916 | Knight | Feb. 18, 1919 |
| 1,606,401 | Craft | Nov. 9, 1926 |
| 1,808,736 | Hernke | June 2, 1931 |
| 1,980,255 | Covich | Nov. 13, 1934 |
| 2,132,056 | Tate | Oct. 4, 1938 |
| 2,518,517 | Baulski | Aug. 15, 1950 |
| 2,841,910 | Berg et al. | July 8, 1958 |